Patented Jan. 30, 1951

2,539,408

UNITED STATES PATENT OFFICE 2,539,408

MOLDING COMPOSITION AND METHOD OF MAKING SAME

Elbert Edwin Ensign, Ypsilanti, and Royal Arch Van Patten, Garden City, Mich., assignors to Ford Motor Company, Dearborn, Mich., a corporation of Delaware No Drawing. Application June 11, 1948, Serial No. 32,524

7 Claims. (Cl. 22—188)

This invention is concerned with the art of founding and more particularly with the molds and cores employed in actually confining the molten metal until it solidifies into the desired shape.

The founding art has long been familiar with the use of the various forms of silica as a molding or core making material and to some extent has taken advantage of the special properties of the various hydrates of calcium sulphate (gypsum) for these purposes. The use of various mixtures of these two substances has also been proposed for foundry use.

As the art of founding has progressed, there has been an insistent demand for a molding or core making material capable of accurately and faithfully reproducing a desired structure with a fine surface. This demand has been partially fulfilled by the development of the various so-called "investment" and "precision" casting techniques employing such special ingredients as the alkyl silicates which are readily decomposable to give a very finely divided silica. These methods are capable of producing excellent castings, but have been reserved for very special work because of the costs involved.

Accordingly, it is an object of this invention to provide a mold or core making material which will accurately and faithfully reproduce any desired structure and which will yield a surface of such a character that little or no finishing work will be required.

It is a further object of this invention to produce a mold or core making material which is extremely economical to prepare and use, is non-toxic and may be handled by unskilled or semi-skilled labor. Further objects of this invention will become apparent as the description proceeds.

The basic material employed in making these molds or cores is a mixture of approximately 30 per cent of the hemihydrate of calcium sulphate ($CaSO_4 - \frac{1}{2}H_2O$) and 70 per cent of silica flour. In the initial preparation of molds according to our invention, a mixture of 30 per cent of hemihydrate of calcium sulphate and 70 per cent of silica is moistened with enough water to transform at least a portion of the hemihydrate of calcium sulphate to the dihydrate or gypsum ($CaSO_4 \cdot 2H_2O$). This plasterlike mixture is permitted to set in a form convenient for subsequent heat-treating. After the setting of the sand, calcium sulphate mixture has taken place, it is heat-treated at a temperature sufficiently high to cause at least a partial interaction between the gypsum and the silica to produce silicates of calcium intermixed with uncombined silica and gypsum. This mixture is cooled and ground preferably to about the particle size of the original silica flour.

The heat-treated mixture prepared and ground, as set forth in the preceding paragraph, is mixed with an equal amount of an unheated and uncombined mixture of 30 per cent of the hemihydrate of calcium sulphate and 70 per cent of silica flour. This fresh calcium sulphate and silica may be added as individual ingredients or as a premix. While it is possible to employ in this process both for the heat-treated and the untreated mixture ordinary commercial hemihydrate of calcium sulphate, it is preferred to employ this substance in a state of subdivision of the same order as that of the silica flour to expedite the hydration to the dihydrate and to facilitate the reaction with the silica when the mixture is heated. Sufficient water is added to the mixture of the treated and untreated substances to yield a composition having the desired properties. This mixture can now be formed into molds or cores and will quickly set and retain the form so imparted.

The particular methods or apparatus employed in forming the material into molds or cores is immaterial and forms no part of this invention. Such methods may well be those now conventionally employed for like purposes. If it is desired to employ these molds or cores in connection with aluminum or any metal having approximately the same melting point, no further heating or baking of the mold or core is necessary—it being sufficient to simply air-dry it at room temperature for about 16 hours. However, if it is desired to use such a mold or core in connection with metals which melt at considerably higher temperatures as, for example, the various bronzes which are poured at about 2000° F., a baking step at a temperature of about 400° F. should be employed. The time of baking cannot be precisely specified because it is dependent upon the size and minimum section of the mold or core and must be experimentally determined for each individual case.

Substantial economies are possible in this process if the original heating step which is employed to cause a partial reaction between the calcium sulphate and silica is omitted and instead about 50 per cent by weight of the used molds are ground to approximately the particle size of the silica flour and substituted for the heat-treated mixture. By this expedient a double economy is effected in that the amount of mold material to be used is sharply reduced, and the cost of the heat-treatment is eliminated, the necessary heat being imparted by contact with the hot metal being cast.

By the use of this material it has been possible to cast intricate objects having complicated contours and to produce a surface finish sufficiently good to obviate the necessity of any machining whatever. This material has been of particular value in the casting of aluminum torque convertor parts where a fine finish is necessary to avoid large losses due to turbulent fluid flow over such surfaces if rough and where the design of the part is such that mechanical finishing operations are impractical.

We claim as our invention:

1. The method of preparing a foundry mold or core comprising mixing the hemihydrate of calcium sulphate with silica flour, moistening the mixture sufficiently to provide the water of hydration of at least a portion of the hemihydrate of calcium sulphate, allowing the moistened mix to set, heating the set mix sufficiently to cause a partial interaction between the hydrate of calcium sulphate and silica, grinding the interacted mass, mixing it with fresh unreacted hemihydrate of calcium sulphate and silica flour, moistening the last-mentioned mixture and permitting the moistened mixture to set to form foundry molds and cores.

2. The process recited in claim 1 in which the ratio of the calcium sulphate hydrates calculated as the hemihydrate to the silica is as three is to seven.

3. The method of preparing a foundry mold or core comprising mixing 30 per cent of the hemihydrate of calcium sulphate with 70 per cent of silica flour, moistening the mixture sufficiently to provide the water of hydration of at least a portion of the hemihydrate of calcium sulphate, allowing the moistened mix to set, heating the set mix sufficiently to cause a partial interaction between the hydrate of calcium sulphate and silica, grinding the interacted mass, mixing it with an equal weight of a mixture of fresh unreacted hemihydrate of calcium sulphate and silica flour in which mixture the weight of the hemihydrate of calcium sulphate is to the weight of the silica as three is to seven, moistening the last-mentioned mixture, permitting the moistened mixture to set and baking the set object to form foundry molds or cores.

4. The process set forth in claim 1 in which the partially reacted mixture of calcium sulphate and silica is obtained by grinding molds or cores which have been employed previously to confine molden metal during a casting operation.

5. A composition of matter comprising a homogenous pulverulent mixture of the product obtained by heating together the dihydrate of calcium sulphate and silica flour until at least a partial reaction occurs, fresh unreacted silica flour and fresh unreacted hemihydrate of calcium sulphate.

6. A composition of matter comprising a homogenous pulverulent mixture of the product obtained by heating together the dihydrate of calcium sulphate and silica flour until at least a partial reaction occurs, unreacted dihydrate of calcium sulphate, unreacted silica flour, fresh unreacted silica flour and fresh unreacted hemihydrate of calcium sulphate.

7. The process of preparing a molding material comprising exposing a mixture of silica flour and a hydrate of calcium sulphate to heat sufficient to cause at least a partial reaction, pulverizing the mixture so treated to a particle size comparable to that of the original silica flour and adding to the said mixture fresh unreacted silica flour and the hemihydrate of calcium sulphate.

ELBERT EDWIN ENSIGN.
ROYAL ARCH VAN PATTEN.

REFERENCES CITED

The following references are of record in the file of this patent:

UNITED STATES PATENTS

| Number | Name | Date |
|---|---|---|
| 661,247 | Johnson | Nov. 6, 1900 |
| 1,901,052 | Dailey | Mar. 14, 1933 |
| 2,220,703 | Bean | Nov. 5, 1940 |
| 2,322,638 | Kleeman | June 22, 1943 |
| 2,391,855 | Bean | Dec. 25, 1945 |
| 2,425,891 | McMullen | Aug. 19, 1947 |